United States Patent

Hatch

(10) Patent No.: US 11,691,316 B2
(45) Date of Patent: Jul. 4, 2023

(54) COMMERCIAL RECYCLING SYSTEM AND METHOD

(71) Applicant: QUEST RESOURCE MANAGEMENT GROUP, The Colony, TX (US)

(72) Inventor: S. Ray Hatch, Frisco, TX (US)

(73) Assignee: Quest Resource Management Group, The Colony, TX (US)

( * ) Notice: Subject to any disclaimer, the term of this patent is extended or adjusted under 35 U.S.C. 154(b) by 0 days.

(21) Appl. No.: 17/657,026

(22) Filed: Mar. 29, 2022

(65) Prior Publication Data

US 2022/0305695 A1    Sep. 29, 2022

Related U.S. Application Data

(60) Provisional application No. 63/200,785, filed on Mar. 29, 2021.

(51) Int. Cl.
*B29B 17/02*    (2006.01)
*B65F 1/14*    (2006.01)
(Continued)

(52) U.S. Cl.
CPC ............ *B29B 17/02* (2013.01); *B65F 1/14* (2013.01); *B65F 3/00* (2013.01);
(Continued)

(58) Field of Classification Search
CPC ... B29B 17/02; B29B 2017/0089; B65F 1/14; B65F 3/00; B65F 2001/1676;
(Continued)

(56) References Cited

U.S. PATENT DOCUMENTS 10,005,587 B2    6/2018    Whitman et al.
10,913,574 B1    2/2021    Winn et al.
(Continued)

FOREIGN PATENT DOCUMENTS

CA    2852784 A1 * 11/2015    ............... B65F 1/14
CN    109256229 A * 1/2019    ............... G21F 5/12
(Continued)

OTHER PUBLICATIONS

David Parry, "Sustainable Food Waste Evaluation", Jun. 2012, IWA Publishing, vol. 11, abstract. (Year: 2012).*

(Continued)

*Primary Examiner* — Tan D Nguyen
(74) *Attorney, Agent, or Firm* — Haynes and Boone, LLP

(57) ABSTRACT

A system for recycling organics from a commercial facility includes a plurality of waste producing facilities each producing recyclable waste including organics and food packaging; one or more bins at each of the waste producing facilities, the bins being able to house the recyclable waste; a distribution center; a recycling facility able to separate the organics from the food packaging; one or more first vehicles for transporting the bins containing the recyclable waste from the plurality of waste producing facilities to the distribution center; and one or more second vehicles for transporting the recyclable waste from the distribution center to the recycling facility.

18 Claims, 5 Drawing Sheets

(51) Int. Cl.
  *B65F 3/00* (2006.01)
  *B29B 17/00* (2006.01)
  *B65F 1/16* (2006.01)
(52) U.S. Cl.
  CPC .......... *B29B 2017/0089* (2013.01); *B65F 2001/1676* (2013.01); *B65F 2210/1123* (2013.01); *B65F 2210/167* (2013.01); *B65F 2220/106* (2013.01); *B65F 2220/124* (2013.01); *B65F 2240/156* (2013.01)
(58) Field of Classification Search
  CPC ........ B65F 2210/1123; B65F 2210/167; B65F 2220/106; B65F 2220/124; B65F 2240/156; B65F 1/1484; B65F 1/1615; B65F 1/06; B29L 2031/712
  See application file for complete search history.

(56) References Cited

U.S. PATENT DOCUMENTS

| | | | | |
|---|---|---|---|---|
| 2015/0315466 | A1* | 11/2015 | Morash | A23K 20/00 47/58.1 SC |
| 2016/0083184 | A1* | 3/2016 | Rathore | B65F 1/14 220/592.01 |
| 2016/0157647 | A1* | 6/2016 | Rampersad | A61F 13/105 294/25 |
| 2016/0207705 | A1* | 7/2016 | Rudiak | B65F 1/16 |
| 2018/0002097 | A1* | 1/2018 | Farrell | F26B 9/003 |
| 2018/0030399 | A1* | 2/2018 | Allen | C12M 43/02 |
| 2019/0062011 | A1* | 2/2019 | Leo | B65D 51/244 |
| 2019/0112102 | A1 | 4/2019 | Whitman et al. | |

FOREIGN PATENT DOCUMENTS

| | | | | |
|---|---|---|---|---|
| CN | 109378101 A | * | 2/2019 | |
| CN | 209103832 U | * | 7/2019 | .............. G21F 5/12 |
| JP | 2002165564 A | | 6/2002 | |
| WO | WO-2016179427 A1 | * | 11/2016 | ........... A41D 13/087 |
| WO | WO-2018167192 A1 | * | 9/2018 | ............. B29C 49/24 |
| WO | WO-2018167193 A1 | * | 9/2018 | ......... B29C 49/0005 |

OTHER PUBLICATIONS

Mohamad Khasreen, "Life-Cycle Assessment and the Environmental Impact of Buildings: A Review", 2009, Sustainability, ISSN 2071-1050, pp. 674-701. (Year: 2009).*

Andrew Camann, "Properties, Recycling and Alternatives to PE Bags," 2010, Project Report to Worcester Polytechnic Institute, Mar. 2010, pp. 1-133. (Year: 2010).*

International Search Report and Written Opinion issued by the United States Patent and Trademark Office as International Searching Authority for PCT/US2022/071414, dated Jun. 6, 2022. (8 pgs.).

Amazon. "EcoSafe-6400 HB8270-12 Certified Compostable Bag-82×70' Green Bags for 152 Gallon Bin—Extra Strong Leak, Puncture and Tear Resistant Food Scraps Bin Liners, Pack of 25". . . [online], Feb. 12, 2014; (Retrieved on May 16, 2022], Retrieved from the internet: <url: https ://www.amazon.com/EcoSafe-6400-CP1617-6-Compostable-Certified-2-5-Gallon/dp/B00IF ZD63K/ref=cm_cr_arp_d_bdcrb_top?ie=UTF8&th=1 >; entire document. (9 pgs.).

* cited by examiner

COMMERCIAL RECYCLING SYSTEM AND METHOD

CROSS-REFERENCE TO RELATED APPLICATIONS

The present application claims benefit of U.S. Provisional Application No. 63/200,785 filed Mar. 29, 2021, entitled "Commercial Recycling System And Method," which is incorporated herein by reference in its entirety.

FIELD OF THE DISCLOSURE

The present disclosure relates to a commercial recycling system and method. More particularly, the present disclosure relates to aggregation and diversion of organics, packaging, and ancillary waste from a commercial facility.

BACKGROUND

Manufacturers, suppliers, and retailers of food products naturally yield mixed waste including organics, packaging, and other ancillary waste. Current commercial recycling processes for these businesses involve using separate collection bins for each type of waste, such as packaged organics, non-packaged organics, meat renderings, floral products, and paper products. Separate waste streams are then required to accommodate each of these types of waste, and each waste stream incurs its own costs. A further drawback of conventional commercial recycling operations is that significant employee training is needed to ensure proper execution (i.e., proper separation and disposal of the various types of waste). Moreover, these processes inherently involve numerous sanitation and health issues, including spillage, cross-contamination, and deterioration of physical assets, all while requiring a large footprint at the commercial facility.

The above issues result in a significant volume of waste going to landfills rather than being properly recycled (currently around 44% of food waste). Current landfill volumes are less than optimal and solid waste costs are high. Unfortunately, the currently available commercial recycling processes used to limit landfilling waste are costly due to the numerous waste streams, staff training, and ongoing management of sanitation and health issues. As such, there remains a need for an improved commercial recycling process.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements. Embodiments are described in detail hereinafter with reference to the accompanying figures, in which.

DETAILED DESCRIPTION

Figure 1:
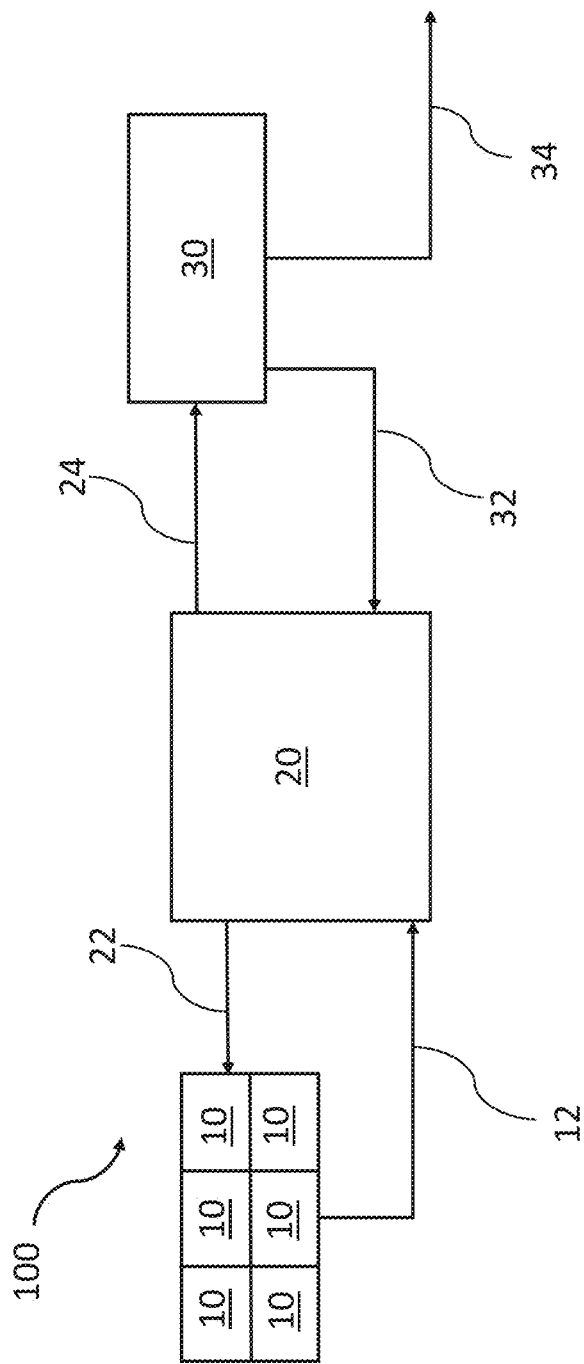
FIG. 1 is a schematic diagram showing a commercial recycling system according to an embodiment of the present disclosure.

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

With reference to FIG. 1, a commercial recycling system 100 may be used for aggregation and diversion of organics, packaging, and ancillary waste (collectively referred to hereinafter as "recyclable waste") from a plurality of waste producing facilities 10. As used herein, "organics" refers to produce, fruits, bakery products, deli products, meat, seafood, fruit and vegetable juices (e.g., from a juice bar), coffee products (e.g., from a coffee bar), and/or unpackaged bulk food items. As used herein, "packaging" refers to packaged food waste including, e.g., regular or waxed cardboard, plastic, aluminum cans, and/or glass. In other words, packaged food waste includes organics packaged in inorganic packaging. As used herein, "ancillary waste" refers to floral products and waste and/or paper products, such as office paper, newspapers, magazines, cardstock, and/or greeting cards. According to one or more embodiments, the recyclable waste does not include trash, plastics without food, plastic bags or films, aluminum foil, styrofoam, hazardous waste, and/or electronic waste. The waste producing facilities 10 are not particularly limited but are generally facilities that produce the aforementioned recyclable waste as part of their operations. The waste producing facilities 10 may include, for example, a manufacturer, supplier, or retailer of food products. In some embodiments, the plurality of waste producing facilities 10 may be grocery stores, restaurants, other food retailers, hotels, and/or resorts.

At the waste producing facilities 10, the recyclable waste is collected in a single waste stream, i.e., it is not separated into different containers based on the type of waste. The single waste stream may include all organics, packaging and ancillary waste from the waste producing facility 10. This single waste stream greatly reduces the need for employee training and also eliminates or significantly reduces sanitation and health issues such as cross-contamination. In some embodiments, a single collection container may be used at the waste producing facility. In other embodiments, a plurality of smaller collection containers may be used at waste producing facilities 10. Such embodiments may be utilized at large waste producing facilities that have larger physical footprints and require several facility collection points. Ultimately, the single waste stream will all feed into a single container (bin) suited for transportation, discussed in more detail below. In some embodiments, the single waste stream includes, produce, fruits, bakery products, deli products, meat, seafood, juice bar waste, coffee bar waste, unpackaged bulk food items, packaged food waste with regular or waxed cardboard and/or plastic packaging, floral, and/or paper products such as office paper, newspapers, magazines, cardstock, and/or greeting cards.

In some embodiments. the single waste stream includes aluminum cans and/or glass. In some embodiments, the aluminum cans and/or glass are separately bagged at the waste producing facility 10 and processed separately at a recycler 30. In such embodiments, glass and metal may be put in a plastic bag and set on top of full recycling bins at the waste producing facility 10. The bags may then be loaded with the bins being transported to a distribution center 20. The bags may then continue to follow the same transportation process with the bins until arrival at the recycler 30, where they are pulled to the side for separate processing. Such embodiments allow for glass and metal (jars, cans, bottles, etc.) to be included in the single stream collection process, which provides safer, more efficient operations from start to finish.

The single waste stream for all organics, packaging and ancillary waste yields a smaller physical footprint at all locations within the system 100, less employee training due to the elimination of multiple containers and multiple streams/processes, improved safety through the entire system 100, improved health through the entire system 100, reduced chance of contamination, spills or leakage through the entire system 100, and/or simpler, more efficient operations and improved cost control through the entire system 100.

Figure 2:
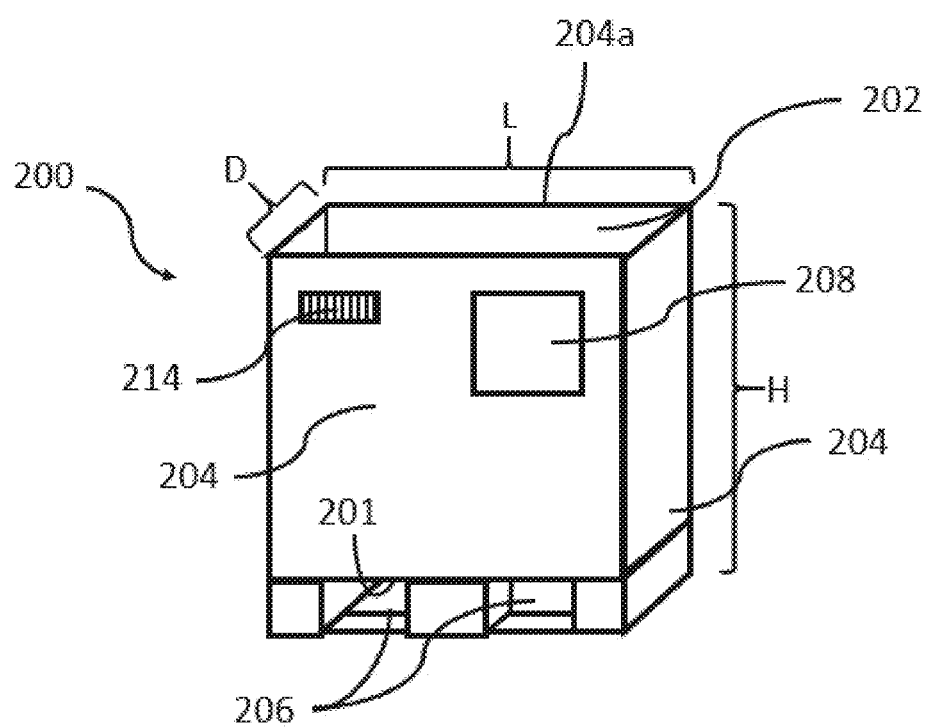
FIG. 2 is a perspective view of a bin according to an embodiment of the present disclosure.

Referring to FIG. 2, according to one or more embodiments, the single waste stream of recyclable waste is collected at the waste producing facilities 10 using one or more bins 200 formed of a durable, washable material such as plastic. The bins 200 are configured to be washable, such that they may be cleaned and dried after each use before being returned to the distribution center 20 from the recycler 30. This allows for quick and easy cleaning prior to next use of the bins 200.

In some embodiments, the bin 200 is a specific size, shape and type of material that allows it to be used for the entire transportation process until the waste reaches its final disposition (recycler 30). In such embodiments, the bin 200 does not have to be physically touched or manipulated from the time the bin 200 is closed to start transportation at waste producing facilities 10, until the time the bin is emptied at recycler 30. Such embodiments may improve health and safety, reduce the chance of contamination, spills, or leakage, and/or allow for more efficient operations and improved cost control.

The bin 200 include an open top 202 into which waste may be deposited. The bin 200 further includes sidewalls 204. In some embodiments, the sidewalls 204 form air-tight and/or water-tight junctions. The bin 200 includes a floor 201 opposite the open top 202. In some embodiments, junctions between the sidewalls 204 and the floor 201 are air-tight and/or water-tight. In some embodiments, the bin 200 may measure approximately 45"×48"×34" (length L×depth D×height H), 20-55"×22-58"×20-40", 35-55"×38-58"×29-39", or 40-50"×43-53"×32-36", 20-40"×22-42"×20-30", 25-35"×27-37"×22-28", or approximately 30"×32"×25". In some embodiments, a large bin 200 measures approximately 45"×48"×34" and a small bin 200 measures approximately 30"×32"×25". In some embodiments, the large bin 200 may accommodate a typical waste producing facility 10. In some embodiments, the small bin 200 may accommodate smaller waste producing facilities 10 or those with more limited space. In some embodiments, all bin sizes provide the same function. According to some embodiments, the waste producing facilities 10 may employ smaller containers throughout the waste producing facilities 10 for collecting the recyclable waste, wherein the smaller containers may be periodically emptied into the bins 200. In some embodiments, the smaller containers may be of similar composition and configuration as the bin 200 described herein.

In one or more embodiments, the bin 200 may have a weight capacity of at least 500 lbs., at least 1000 lbs., at least 1500 lbs., or at least 2000 lbs. In one or more embodiments, the bins 200 may be stackable up to a height of 5, 4, 3, or 2 bins 200. In some embodiments, the large bins 200 may be stacked 3 high in storage and 2 high in trailers. In some embodiments, the large bins 200 may be arranged 2 across in a trailer. In some embodiments, a trailer may accommodate 27-33 large bins 200 while not exceeding Department of Transportation requirements for transport of 25 tons. In some embodiments, a weight capacity per large bin is 1500 lbs. In some embodiments, the small bins 200 may be stacked 5 high in storage and 3 high in trailers. In some embodiments, the small bins 200 may be arranged 3 across in a trailer. In some embodiments, a trailer may accommodate 50-55 small bins 200 while not exceeding Department of Transportation requirements for transport of 25 tons. In some embodiments, a weight capacity per small bin 200 is 1000 lbs.

The bins 200 may be configured to accommodate being moved by pallet jack or four-way forklift (e.g., access at bottom). For example, as shown in FIG. 2, the bin 200 includes openings 206 to allow a forklift to easily lift the bin 200. Such a configuration allows for easy, secure handling, easy loading and unloading onto trailer trucks, and/or allows bins 200 to be emptied at a final disposition point (recycler 30) by transferring the contents of the bin 200 directly into the recycling process using a forklift, thereby avoiding human contact, manual processing, or separation of the waste as part of the emptying of the contents. These embodiments are safer, healthier, and more efficient than existing methods and systems.

In some embodiments, the bin 200 may be collapsible to save space when not in use (e.g., while being transported empty). In some embodiments, the sidewalls 204 may be disconnected from one another and folded down onto each other or outward. In some embodiments, the bins 200 collapse to one half, one third, or one quarter of their un-collapsed size. Collapsibility and stackability of the bins 200 minimizes storage and transportation space when the bins 200 are not full.

In some embodiments, the bin 200 has a door 208 on at least one sidewall thereof to accommodate meat renderings being added. In some embodiments, the door 208 is hinged on a side or a bottom thereof. In some embodiments, the door 208 may slidingly engage to seal the sidewall 204. The door 208 allows meat renderings to be stored separately in refrigeration at the waste producing facility 10 until being added to the bin 200 for transportation to the distribution center 20. That is, in some embodiments, raw meat and/or meat renderings may be separately stored in containers in a chilled environment (e.g., a refrigerator) and added to the recyclable waste in the bin 200 just before removal from the waste producing facilities 10. In such embodiments, the liner may already be sealed and a lid 210 shown in FIG. 3 and as described below may already be sealed onto the bin 200. Moreover, in some embodiments, the bins 200 may be stacked at the waste producing facility 10, such that the open top 202 is not accessible. As such, the door 208 allows for easy access even after the bins 200 and liners have been prepared for transportation. This added step of separately storing the meat waste may help reduce odor and other health concerns associated with raw meat by suppressing decomposition thereof before the transportation process begins. Further, meat renderings are dense material and become heavy when collected in large containers or bags. The door 208 allows for the easier, safer (less chance of injury or spillage) deposition of meat waste into large/tall bins 200 by decreasing the height and distance of handling the waste when compared to filling from the open top 202 of the bin 200.

The bin configuration described herein minimizes the physical footprint at the various waste producing facilities 10 while still providing the needed space to best manage the waste stream and/or provides for the efficient use of space and better management of transportation cost in the various sized truck trailers in the marketplace (typically between 48 and 53 feet).

Figure 3:
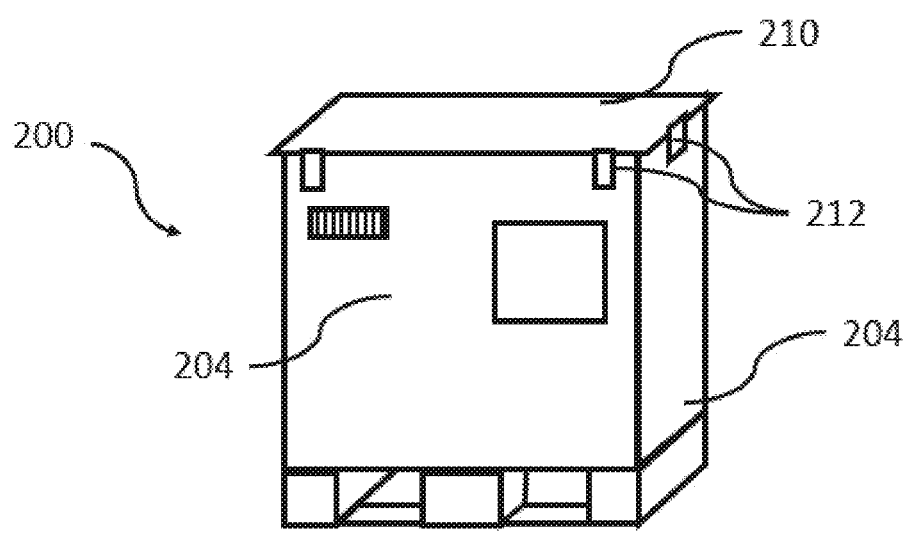
FIG. 3 is a perspective view of a bin according to an embodiment of the present disclosure.

Referring to FIG. 3, according to embodiments of the present disclosure, the bin 200 includes a lid 210. In some embodiments, the lid 210 is fully detachable. In other embodiments, the lid 210 is connected to the bin 200 by, e.g., a hinge. In some embodiments, the lid 210 is configured to seal the bin 200 to be air-tight and/or water-tight. In some embodiments, sealing of the lid 210 onto the bin 200 may be facilitated by latches 212. The lid 210 is used once transportation begins and can also be used while at the waste producing facilities 10 prior to being closed for transportation. The lid 210 further protects waste material from contamination, spills, or leakage during transportation and/or storage.

In embodiments of the present disclosure, the bin 200 includes a liner. The liner may be compostable (per the ASTM D6400 standards for compostability) and may be fully compostable in approximately 50-100 days in properly maintained compost facilities. Using a liner can reduce maintenance costs associated with the bin 200 (e.g., cleaning) and may protect the bin 200 from caustic materials. In one or more embodiments, the liner is heavy gauge (e.g., at least 0.6 mil or at least 2 mm) to improve durability. According to some embodiments, the liner is made from renewable resources and a compostable polymer-based resin and is non-toxic. In some embodiments, the liners are made from polylactic acid (PLA) to support compostability. In some embodiments, the liners are configured to eliminate transfer of moisture (i.e., the liners are water-tight and leak-proof). The liner configuration described herein allows the liner to be disposed of as part of the waste recycling process instead of having to be removed and/or processed separately, improves safety and health, reduces the chance of contamination, spills or leakage, and/or allows for more efficient operations and improved cost control.

In some embodiments, all bins 200 are lined with a fully compostable liner that covers the bottom and sides (i.e., the interior of sidewalls 204) of the bin 200 and is folded over a top ledge 204a of the sidewalls 204 to hold it in place while in use. A new liner may be placed inside the bin 200 prior to the waste starting to be collected. The liner is sealed (e.g., tied shut) prior to the lid 210 being put on the bin 200 and/or prior to being transported. In some embodiments, the liner is custom sized for a 45"×48"×34" bin 200 (a large bin) to allow for an easier and more secure tying of the liner. Once the bin 200 reaches the site of final disposition (e.g., a recycler 30, discussed in more detail below), the lid 210 of the bin 200 is removed and the sealed liner is dropped out of the bin 200 "as is" directly into the recycling process at the recycler 30. Once closed, the liner requires no human contact, manual processing, or separation of the waste from the time it leaves the waste producing facility 10 until it arrives at the recycler 30. This configuration secures waste for the entire transportation process, improves safety, improves health, reduces the chance of contamination, spills, or leakage, and/or allows for more efficient operations and improved cost control.

Once the liner in the bin 200 is closed at a waste producing facility 10 and the lid 210 is sealed on the bin 200, the bag is never physically touched again by a worker. No further human contact with the waste yields improved safety through the entire system 100, improved health through the entire system 100, reduced chance of contamination, spills, or leakage through entire system 100, and/or more efficient operations and improved cost control through the entire system 100. Further, the combination of the secured, closed waste bag (liner), single collection point, and single stream process (elimination of multiple containers and multiple waste streams) provides a significantly more controlled environment for the waste. The system 100 allows for the bin 200 to be kept inside a climate-controlled area of the waste producing facility 10 instead of outside where external environmental elements are introduced. The system 100 also provides reduced odor through the entire system 100, reduction in flies, mosquitos and other insects through the entire system 100, reduced possibility of rodent infestation through the entire system 100, and/or reduced wear on floor services and outside concrete.

At the waste producing facilities 10, the bins 200 may be stored in a collapsed configuration when not in use and, when in use, may be placed in a discrete location such as in a back room or behind the waste producing facilities 10. Collapsing the bins 200 can maximize space efficiency and improve transportation efficiency. In general, the bins 200 are filled with all recyclable waste commingled as it is generated.

In the commercial recycling system 100, the waste producing facilities 10 are in communication with a distribution center 20. The distribution center 20 serves at least as an aggregation point for the recyclable waste from the waste producing facilities 10. In some embodiments, the distribution center 20 may also provide the waste producing facilities 10 with products, such as food products, via line 22. The distribution center 20 may also provide the waste producing facility 10 with empty bins 200 via line 22 (along with any liners and lids 210 for the bins 200, as may be appropriate). The number of empty bins 200 provided to each waste producing facility 10 may be dictated by the facility's expected recyclable waste production. Line 22 may comprise any mode for transporting the supplies (bins 200, lids 210, liners, etc.) and/or products, such as trucks or trains. Via line 12, the waste producing facility 10 returns recyclable waste, consolidated in a single waste stream (i.e., mixed in the bins 200), to the distribution center 20. Line 12 may include the same mode of transportation as line 22. In some embodiments, the mode of transportation is trucks, and the same trucks that deliver supplies and products from the distribution center 20 to the waste producing facilities 10 transport recyclable waste from the waste producing facilities 10 back to the distribution center 20. This cycle may be repeated as frequently as needed, e.g., on a weekly basis. In some embodiments, the mode of transportation includes truck trailers having a have solid wood or metal flooring for transporting the waste. Such a configuration supports safe, direct loading of containers with a forklift.

In one or more embodiments, a delivery truck is loaded with products and empty (optionally, collapsed) bins 200 at the distribution center 20. The products and empty bins 200 are then transported to a waste producing facility 10. After the products and empty bins 200 are offloaded at the waste producing facility, bins 200 full of recyclable waste from the waste producing facility 10 are loaded onto the same truck. The truck then returns to the distribution center 20, where the full bins 200 are offloaded and aggregated. A single delivery truck may service a plurality of waste producing facilities 10. Alternatively, each waste producing facility 10 may utilize one or more delivery trucks.

In the commercial recycling system 100, the distribution center 20 is in communication with at least one recycler 30. The recycler 30 comprises a depackaging facility for separating the commingled recyclable waste into an organics stream and a food packaging stream. Using this capability of the recycler 30 enables the initial commingling of the recyclable waste at the waste producing facilities 10. However, in general, any one waste producing facility 10 does not produce enough recyclable waste to warrant direct transport of the recyclable waste to the recycler 30. That is, such direct transport would not be economical unless the waste producing facility 10 were able to fill a threshold capacity of the transport with recyclable waste. Moreover, even if the waste producing facility 10 is capable of producing such an amount of recyclable waste, it may not be economical or even possible to store such a large amount of recyclable waste at the waste producing facility 10. Such storage also raises health and sanitation concerns if the recyclable waste is not removed with adequate frequency.

Accordingly, in the present system 100, the recyclable waste is routed from the plurality of waste producing facilities 10 to the distribution center 20 where the recyclable waste is aggregated into larger loads. The distribution center 20 is better equipped to store a large amount of waste as compared with the waste producing facilities 10. Also, by aggregating the recyclable waste from a plurality of waste producing facilities 10, the distribution center 20 is able to more frequently accumulate full loads of recyclable waste to be transported to the recycler 30. In some embodiments, a full load may be considered at least 50%, at least 75%, at least 90%, or about 100% of the volume or weight capacity of a cargo container or trailer. In some embodiments, storage at the distribution center 20 may comprise storing full bins 200 of recyclable waste in trailers, wherein 2-5 full bins 200 may be stacked on each other. Once a given trailer is filled (i.e., reaches a threshold volume or weight capacity), the trailer may be transported from the distribution center 20 to the recycler 30 and unloaded. In FIG. 1, the transportation of the recyclable waste from the distribution center 20 to the recycler 30 is shown by line 24. The mode of transportation for line 24 may be the same as or different from that described above with respect to lines 22 and 12.

In some embodiments, the recycler 30 may also include or be associated with a waste-to-energy plant, a compost facility, a biofuel plant, an animal feed plant, and/or a landfill. In one or more embodiments, the organics stream is used to create compost, biofuel, or animal feed. In some embodiments, the food packaging stream is recycled or sent to a waste-to-energy plant for conversion to electricity.

At the recycler 30, the trailers or cargo containers carrying bins 200 of recyclable waste from the distribution center 20 are emptied. Any bins 200 (and lids 210) used to transport the recyclable waste are returned to the distribution center 20 via line 32 so that they may be used again by the waste producing facilities 10. In some embodiments, the bins 200 are cleaned and collapsed at the recycler 30 before being returned to the distribution center 20. In some embodiments, the cleaned and collapsed bins 200 are aggregated at the recycler 30 to reduce the number of trips back to the distribution center 20. For example, if the bins 200 collapse to one quarter of their size, the number of trips along line 32 may be about one quarter of the number of trips along line 24. The mode of transportation along line 32 is not particularly limited and, in some embodiments, line 32 employs the same mode of transportation as line 24.

According to one or more embodiments, the system 100 may include a tracking system. The tracking system may comprise barcodes 214 on the bins 200 and scanners for scanning the barcodes 214. Scanners may be used at the waste producing facilities 10, the distribution center 20, and/or the recycler 30. The location of the bins 200 may be tracked using the tracking system to ensure, e.g., that each waste producing facility 10 has a sufficient number of bins 200. The waste producing facilities 10 may be able to request additional bins 200 using the tracking system. Additionally, the amount of recyclable waste produced by each waste producing facility 10 may be monitored using the tracking system. Weighing the full bins 200 may take place at the waste producing facilities 10, the distribution center 20, and/or the recycler 30. Monitoring the recyclable waste of each waste producing facility 10 allows for efficient deployment of resources. The use of a tracking system allows for the measurement of waste activity and supports more sustainable operations.

In some embodiments, all bins 200 are tracked from start to finish using a bar code system. According to some embodiments, a custom scanning system enables the recycler 30 to use scanners so that weights can be determined for each bin 200 and associated to the exact waste producing facility 10. Each bin 200 may include a point in time order code issued once the bin was requested for the waste producing facility 10. A barcode 214 may be applied to the container with the bar code number that identifies the individual waste producing facility 10. The barcode 214 may be associated with the material as it moves from the waste producing facility 10 to the distribution center 20 and then to the recycler 30. In some embodiments, the system 100 eliminates the need for a manifest (i.e., detailed documentation for each shipment of bins 200). In some embodiments, the system 100 is streamlined so a bar code only has to be read one time. For example, the barcode 214 may be scanned at the recycler 30 and referenced when weighing the material at the recycler 30 and may then be included in reporting to, e.g., the waste producing facility 10 and/or the distribution center 20. In such embodiments, the barcodes 214 and associated weights are used to link material generation data ("the collected data") to each waste producing facility 10 and the collected data may be reported out on a periodic basis. In some embodiments, the collected data is stored as part of comprehensive reporting system that gives the waste producing facility 10 key waste and recycling metrics, such as waste volume collected, waste volume recycled, value of recycled material generated, and/or waste volume trends (cumulative of all waste producing facilities 10 or individual waste producing facilities 10). The tracking system described herein can provide verified data of all waste activity to support business and sustainability decisions and/or provide metrics for sustainability and ESG (Environmental, Social, Governance) reporting.

Figure 4:
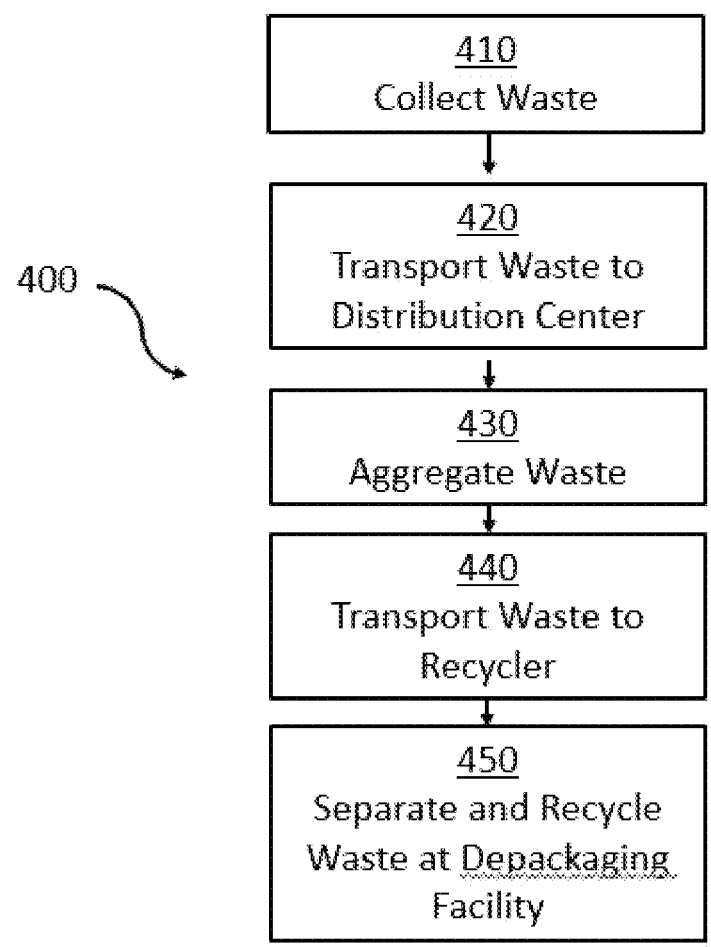
FIG. 4 is a flow chart depicting a method of commercial recycling according to an embodiment of the present disclosure.

Turning to FIG. 4, a commercial recycling method 400 is illustrated. The method 400 includes a step 410 of collecting recyclable waste. The recyclable waste includes organics, packaging, and ancillary waste, as described above. The collecting step 410 comprises consolidating recyclable waste into bins 200 at one or more waste producing facilities 10. The bins 200, liners, lids 210, and waste producing facilities 10 are as described above. Prior to the collecting step 410, the method 400 may optionally include a step of providing empty bins 200 to the waste producing facilities 10, e.g., from the distribution center 20. After step 410, the bins 200 of recyclable waste are transported from the waste producing facilities 10 to the distribution center 20 in a transporting step 420. The mode of transportation in the transporting step 420 is not particularly limited and may include, e.g., trailers or cargo containers moved via truck and/or train.

Next, in an aggregating step 430, the bins 200 of recyclable waste are unloaded at the distribution center and aggregated from a plurality of waste producing facilities into full loads. A full load may be considered at least 50%, at least 75%, at least 90%, or about 100% of the volume or weight capacity of a cargo container or trailer. In some embodiments, the aggregating step 430 comprises unloading the bins 200 directly into trailers parked at the distribution center 20. Next, in step 440, the aggregated waste is transported from the distribution center 20 to the recycler 30. The mode of transportation in the transporting step 440 may be the same as that in step 420. In step 450, the recyclable waste at the recycler 30 is separated using a depackaging facility. In some embodiments, the method 400 may include a step of cleaning and returning empty bins 200 from the recycler 30 to the distribution center 20. In some embodiments, the bins 200 include compostable liners, the step 450 includes separating the compostable liners from food packaging, and the method 400 includes a step of composting the compostable liners.

Figure 5:
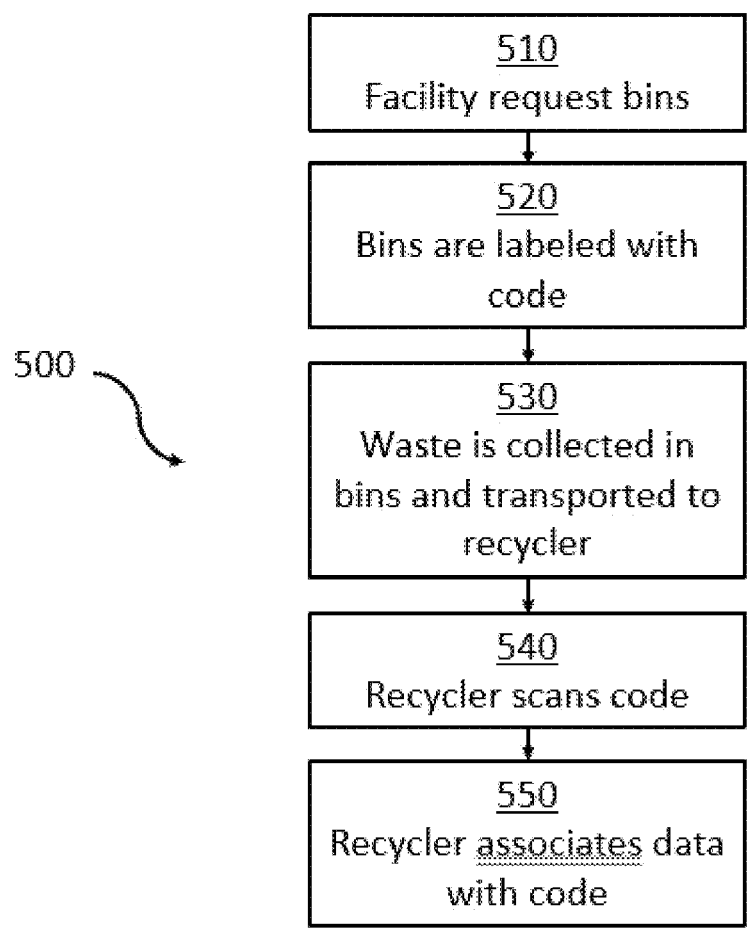
FIG. 5 is a flow chart depicting a method of tracking waste according to an embodiment of the present disclosure.

Turning to FIG. 5, a waste tracking method 500 is depicted. In step 510, a waste producing facility 10 requests one or more bins 200 (and, optionally, lids 210 and/or liners). In step 520, a unique code is generated and a barcode 214 including the same is applied to the requested bins 200. In some embodiments, each bin 200 may include a unique code. In other embodiments, a single code may be used for all bins 200 associated with a single waste producing facility 10 or a group of waste producing facilities 10. Next in step 530, waste is collected in the bins 200 at the waste producing facility 10 and transported to the recycler 30 via the distribution center 20, as described in method 400 above. In step 540, the recycler 30 scans the barcode 214 to identify the bin 200. In step 550, the recycler 30 associates data with the code. In some embodiments, the data is the weight of the waste in the identified bin 200.

According to embodiments disclosed herein, the commercial recycling system and method are able to enhance operational efficiencies and the recycling of organics and ancillary waste materials, ultimately improving profitability and sustainability. In some embodiments, the present system and method may yield nearly 100% recycling of organics, as compared to current food waste landfill diversion rates of around 44%. The present system and method are able to reduce solid waste service costs, eliminate meat rendering costs, and reduce employee training costs. In addition to cost savings, the present system and method also provide improved health and sanitation conditions, such as reduced pests and odor.

Although various embodiments have been shown and described, the disclosure is not limited to such embodiments and will be understood to include all modifications and variations as would be apparent to one of ordinary skill in the art. Therefore, it should be understood that the disclosure is not intended to be limited to the particular forms disclosed; rather, the intention is to cover all modifications, equivalents, and alternatives falling within the spirit and scope of the disclosure as defined by the appended claims.

What is claimed is:

1. A method of commercial recycling, comprising:
    collecting recyclable waste comprising organics and food packaging from a first waste producing facility, wherein collecting comprises aggregating recyclable waste in a first bin comprising a first compostable liner configured to isolate the recyclable waste from surfaces of the first bin;
    transporting the first bin comprising the collected recyclable waste from the first waste producing facility to a distribution center;
    aggregating the recyclable waste at the distribution center by:
    collecting recyclable waste comprising organics and food packaging from a second waste producing facility, wherein collecting comprises aggregating recyclable waste in a second bin comprising a second compostable liner configured to isolate the recyclable waste from surfaces of the second bin;
    transporting the second bin comprising the collected recyclable waste from the second waste producing facility to the distribution center;
    transporting the first and second bins comprising aggregated recyclable waste from the distribution center to a recycling facility;
    delivering one or more empty first and second bins from the distribution center to the first waste producing facility;
    emptying and cleaning the first and second bins at the recycling facility; and
    transporting empty first and second bins from the recycling facility to the distribution center.

2. The method of claim 1, further comprising separating the organics and food packaging at the recycling facility.

3. The method of claim 2, wherein the first and second compostable liners are included with the organics.

4. The method of claim 1, further comprising, prior to transporting, sealing the first compostable liner and sealing a first lid onto the first bin.

5. The method of claim 1, further comprising labeling the first bin with a first barcode, wherein the first barcode associates the first bin with the first waste producing facility.

6. The method of claim 5, further comprising:
    weighing the first bin at the recycling facility prior to emptying and cleaning the first bin; and
    scanning the first barcode to associate weight data of the first bin with the first waste producing facility.

7. The method of claim 6, further comprising communicating weight data to the first waste producing facility.

8. The method of claim 1, wherein the first bin comprises an open top, a closed bottom opposite the open top, and at least four sidewalls joined together to form a water-tight interior, wherein at least one of the sidewalls includes a resealable opening below the open top.

9. The method of claim 8, further comprising separately collecting meat waste at the first waste producing facility, storing the meat waste in a refrigerated environment, and then depositing the meat waste into the first bin via the resealable opening prior to transporting.

10. The method of claim 9, further comprising sealing the first compostable liner and sealing a first lid onto the first bin prior to depositing the meat waste.

11. A system for recycling organics from a commercial facility, comprising:
    a plurality of waste producing facilities, wherein the waste producing facilities each produce recyclable waste comprising organics and food packaging;

one or more bins at each of the waste producing facilities, the bins configured to house the recyclable waste;
a distribution center;
a recycling facility configured to separate the organics from the food packaging;
one or more first vehicles for transporting the bins containing the recyclable waste from the plurality of waste producing facilities to the distribution center; and
one or more second vehicles for transporting the bins containing the recyclable waste from the distribution center to the recycling facility;
wherein the bins comprise compostable liners configured to isolate the recyclable waste from surfaces of the bins; and
wherein the distribution center is configured to aggregate the bins containing the recyclable waste such that a number of bins on the first vehicles is less than a number of bins on the second vehicles.

12. The system of claim 11, further comprising one or more third vehicles for transporting emptied bins from the recycling facility to the distribution center, wherein the first vehicles, second vehicles, and third vehicles may be the same or different.

13. The system of claim 11, wherein the bins are collapsible and stackable.

14. The system of claim 13, wherein each bin is configured to hold at least 1000 lbs. and is stackable to a height of at least 2 bins.

15. The system of claim 11, wherein the waste producing facilities comprise grocery stores.

16. The system of claim 11, wherein the bins further comprise lids, wherein the lids are configured to seal the bins.

17. The system of claim 16, wherein the lids form an air-tight seal on the bins.

18. The system of claim 11, wherein each bin comprises a barcode associating each bin with one waste producing facility.

* * * * *